United States Patent
Hoyt et al.

(10) Patent No.: US 7,733,085 B2
(45) Date of Patent: Jun. 8, 2010

(54) FLANGELESS CANISTER FOR IN-LINE INSPECTION TOOL

(75) Inventors: Philip M. Hoyt, Murray, UT (US); Arthur K. Fox, Murray, UT (US)

(73) Assignee: Electromechanical Technologies, Inc., Murray, UT (US)

( * ) Notice: Subject to any disclaimer, the term of this patent is extended or adjusted under 35 U.S.C. 154(b) by 0 days.

(21) Appl. No.: 12/366,606

(22) Filed: Feb. 5, 2009

(65) Prior Publication Data
US 2009/0199662 A1 Aug. 13, 2009

Related U.S. Application Data

(63) Continuation-in-part of application No. 12/200,934, filed on Aug. 29, 2008, now abandoned.

(60) Provisional application No. 61/065,456, filed on Feb. 11, 2008.

(51) Int. Cl.
*G01N 27/72* (2006.01)
*G01R 33/00* (2006.01)
(52) U.S. Cl. ...................... 324/220; 324/260
(58) Field of Classification Search .............. 324/220, 324/260
See application file for complete search history.

(56) References Cited

U.S. PATENT DOCUMENTS

| | | | |
|---|---|---|---|
| 3,786,684 A | 1/1974 | Wiers et al. | |
| 3,949,292 A | 4/1976 | Beaver et al. | |
| 3,967,194 A | 6/1976 | Beaver et al. | |
| 4,105,972 A | 8/1978 | Smith | |
| 4,769,598 A | 9/1988 | Krieg et al. | |
| 4,835,876 A | 6/1989 | Petermann et al. | |
| 4,852,391 A | 8/1989 | Ruch et al. | |
| 4,883,191 A | 11/1989 | Christensen | |
| 4,953,412 A | 9/1990 | Rosenberg et al. | |
| 5,000,333 A | 3/1991 | Petrelli | |
| 5,532,587 A | 7/1996 | Downs et al. | |
| 5,565,633 A | 10/1996 | Wernicke | |
| 5,850,935 A | 12/1998 | Luburic et al. | |
| 6,031,371 A | 2/2000 | Smart | |
| 6,087,830 A | 7/2000 | Brandly et al. | |

(Continued)

OTHER PUBLICATIONS

BJ Pipeline Inspection Services, Sales Brochure, BJ Process and Pipeline Services, a division of BJ Services Company, Houston, TX, 2003.

(Continued)

*Primary Examiner*—Reena Aurora
(74) *Attorney, Agent, or Firm*—Warren M. Pate, LLC

(57) ABSTRACT

An in-line inspection tool comprising a sensor suite, a processor processing the signal generated by at least one sensor of the sensor suite, and a canister housing the processor is disclosed. The canister may comprise a canister body formed as a hollow cylinder extending along a central axis from a first end to a second end. The canister may further comprise a canister lid inserted within the first end of the canister body. An alignment mechanism may prevent rotation of the canister lid with respect to the canister body about the central axis. A retaining ring may threadedly engage the first end of the canister body to maintain the canister lid within the first end of the canister body.

13 Claims, 6 Drawing Sheets

U.S. PATENT DOCUMENTS

| | | | |
|---|---|---|---|
| 6,107,795 | A | 8/2000 | Smart |
| 6,198,277 | B1 | 3/2001 | Porter et al. |
| 6,640,655 | B1 | 11/2003 | Manzak et al. |
| 6,720,855 | B2 | 4/2004 | Vicci |
| 6,847,207 | B1 | 1/2005 | Veach et al. |
| 7,374,066 | B2 | 5/2008 | Jackson et al. |
| 7,407,115 | B2 | 8/2008 | Laidler |
| 7,416,097 | B2 | 8/2008 | Crisp, III et al. |

OTHER PUBLICATIONS http://www.bjservices.com/website/index.nsf/P&S?openframeset, Process and Pipeline Services, Pipeline Inspection Services, Vectra MFL Tool.

Pipeline Operator Assists in new ILI tool development, Tech Notes: Product Development, Marathon Ashland Pipe Line LLC, Pipeline & Gas Journal, Dec. 1, 2001.

Recent Developments in multi-diameter Inspection Tool Technologies, Kjartan Vartdal and Kjell Traa, PipeCare AS, Stavanger, Norway, The Pipeline Pigging, Integrity Assessment and Repair Conference, Houston, TX, Feb. 5-6, 2003.

FLANGELESS CANISTER FOR IN-LINE INSPECTION TOOL

RELATED APPLICATIONS

This application (1) claims the benefit of U.S. Provisional Patent Application Ser. No. 61/065,456 filed Feb. 11, 2008 and (2) is a continuation-in-part of U.S. patent application Ser. No. 12/200,934 filed Aug. 29, 2008 now abandoned.

BACKGROUND

1. Field of the Invention

This invention relates to pipeline inspection tools, and more particularly to apparatus and methods for a canister for use within an in-line inspection tool.

2. Background of the Invention

Oil, petroleum products, natural gas, hazardous liquids, and the like are often transported using pipelines. The majority of these pipelines are constructed from steel pipe. Once installed, a pipeline will inevitably corrode or otherwise degrade. Proper pipeline management requires identification, monitoring, and repair of defects and vulnerabilities of the pipeline. For example, information collected about the condition of a pipeline may be used to determine safe operating pressures, facilitate repair, schedule replacement, and the like.

Typical defects of a pipeline may include corrosion, gouges, dents, and the like. Corrosion may cause pitting or general wall loss, thereby lowering the maximum operating pressure of the pipeline. Vulnerabilities may also include dents, curvature and bending anomalies, and combined stress and chemical or biological action such as stress corrosion cracking. Without detection and preemptive action, all such defects and vulnerabilities may lead to pipeline failure.

Information on the condition of a pipeline is often collected using an in-line inspection tool. An in-line inspection tool typically uses sensors to collect information about a pipeline as it travels therethrough. In the past, in-line inspection tools have used magnetic flux leakage to determine the condition of a pipeline wall. Flaws in ferromagnetic pipe can be detected by the perturbations they cause in a magnetic field applied to the wall of a pipeline.

The sensors of an in-line inspection tool may generate signals characterizing the perturbations of the magnetic field. These signals (or derivatives thereof) may be stored on a memory device forming part of the in-line inspection tool. Accordingly, in-line inspection tools typically include computer hardware, power sources, and the like housed in canisters. Canisters typically perform two functions. First, they protect their contents from the environment within the pipeline. Second, they form the backbone of the in-line inspection tool.

Typical canisters have flanges extending radially therefrom. These flanges provide a location for bolting a canister to neighboring components such as driving cups, couplers, sealing surfaces or lids, other canisters, and the like. They also consume valuable space. That is, regardless of whether a flange extends radially inward or radially outward from a canister, anything inserted within that canister must be small enough to pass within the bolt circle of the flange. Thus, the flange limits the available internal space.

During the forty years that canisters have been used on in-line inspection tools, there has been a continual need for more interior space than can be accommodated by flanged canisters. Improved designs have expanded the interior of certain canisters by utilizing blind, threaded holes in flanges formed integrally with corresponding canisters. However, in such designs, the flanges continue to limit the diameter of the contents that can be admitted therewith.

As a central, structural component of typical in-line inspection tools, flanged canisters have been too important and performed too many functions to make a replacement evident. However, what is needed is a canister to house and protect components and provide the structural benefits of a flanged canister without the space-consuming liabilities thereof.

SUMMARY

An in-line inspection tool and associated methods in accordance with the present invention may comprise or utilize various components including canisters. Canisters may house electrical equipment (e.g., processors, memory devices, batteries). A canister in accordance with the present invention may be flangeless. Without flanges, the interior diameter of the canister may be constrained only by the required wall thickness of the canister and the clearance between the exterior of the canister and the interior of the pipeline, and not by any flange.

A canister in accordance with the present invention may comprise a canister body, canister lid, retaining ring, and locking ring. A canister body may be configured as a hollow cylinder extending along a central axis with one or both ends open. Accordingly, a canister may comprise multiple canister lids, retaining rings, and locking rings.

A canister lid may be inserted within a canister body substantially exclusively through linear translation of the canister lid with respect to the canister body, thereby avoiding any damage caused by twisting interior components. Once fully inserted within a canister body, a canister lid may seat against a shoulder formed in the wall of the canister body and transfer thereto the load caused by pressure acting on the exterior of the canister.

A canister may comprise an alignment mechanism to ensure proper alignment between a canister body and a canister lid, position interior components and connectors, and prevent rotation of a canister lid with respect to a canister body. In certain embodiments, an alignment mechanism may comprise one or more alignment tabs extending radially from a canister lid and corresponding slots formed within the canister body.

A frame may be secured to an interior surface of a canister lid. Accordingly, the frame may be inserted within the canister body, and withdrawn therefrom, together with the canister lid. The frame may support the electrical components to be housed within the canister.

In certain embodiments, a frame may engage or align with the canister body. For example, a frame may comprise a taper (i.e., a tapered component) configured to abut a corresponding surface formed as part of the canister body. A frame may also comprise one or more apertures configured to engage corresponding extensions extending from the canister body. During assembly, the taper and corresponding surface may act to guide the apertures and extensions (and any other connecting components) into engagement with one another.

A taper may provide a mechanism for conducting heat from the components housed within a canister to the exterior of the canister. For example, components (e.g., processors, circuit boards, and the like) may be secured to a frame such that the heat generated thereby is conducted to a heat sink secured to the frame. A taper may then provide a location where the heat carried by the heat sink may be conducted to the canister body. Alternatively, the frame itself may form the heat sink. Once in the canister body, the heat may be transferred to the fluid surrounding the canister (e.g., the fluid traveling within the pipeline).

Once a canister lid is inserted sufficiently within a canister body, a retaining ring may be installed to seat the canister lid firmly against the shoulder in the canister body. In selected embodiments, a retaining ring may comprise threads sized and positioned to engage corresponding threads formed on the interior of the canister body. As a retaining ring is threaded into place, the canister lid cannot rotate due to the alignment mechanism. Accordingly, no wired connections between the canister lid, frame, and canister body are twisted or misaligned.

A retaining ring may be advanced into the canister body until the canister lid is seated against the shoulder in the canister body with a desired load. Once a canister lid is seated on the shoulder of the canister body and held there by a retaining ring, the position of the canister lid with respect to the canister body is substantially fixed. A locking ring may then be installed to prevent further rotation of the retaining ring. In one embodiment, a locking ring may be bolted to both the retaining ring and the canister lid.

A flangeless canister in accordance with the present invention can have a larger interior diameter than conventional canisters. Accordingly, canisters in accordance with the present invention can hold more electronics than conventional canisters, have a shorter length than conventional canisters, or perhaps both. More space translates into an in-line inspection tools with greater computational capability, memory capacity, and the like. Additionally, the novel frame of the present invention provides significantly improved thermal performance.

In view of the foregoing, an in-line inspection tool in accordance with the present invention may support more sensors, more connections, and faster onboard processors, leading to more detailed pipeline inspection. Additionally, an in-line inspection tool in accordance with the present invention may be used in difficult pipelines where there is a greater risk of a tool becoming stuck.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

Figure 1:
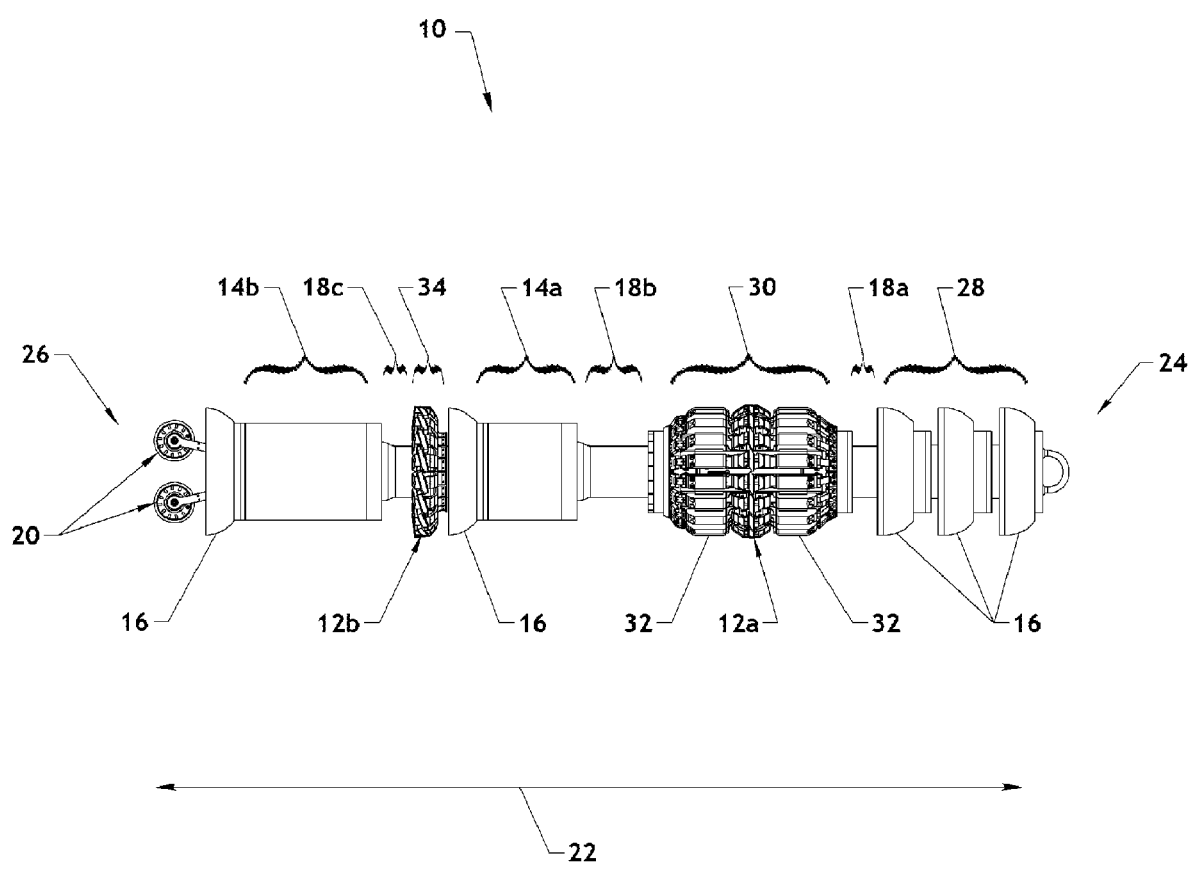
FIG. 1 is an elevation view of an in-line inspection tool in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, an in-line inspection tool 10 in accordance with the present invention may comprise various components including inspection sensors 12, canisters 14, driving cups 16, couplers 18, position sensors 20, and the like. Canisters 14 may house equipment such as one or more processors, memory devices, and batteries. The driving cups 16 may center the tool 10 within the pipeline and enable fluid traveling within a pipeline to engage the tool 10, thereby pushing the tool 10 through the pipeline. In selected embodiments, driving cups 16 may be formed of a somewhat flexible polyurethane or similar material. Couplers 18 may support bending of the tool 10, enabling the tool 10 to accommodate bends in the pipeline. Like the driving cups 16, in selected embodiments the couplers 18 may be formed of a somewhat flexible polyurethane or similar flexible material. Alternatively, couplers 18 may be formed of one or more pivoting mechanical linkages.

An in-line inspection tool 10 may extend in a longitudinal direction 22 from a head end 24 to a tail end 26. The various components 12, 14, 16, 18, 20 of an in-line inspection tool 10 may be arranged in series. For example, in the illustrated embodiment, the head end 24 of a tool 10 may comprise a head section 28 comprising one or more driving cups 16. Following the head section 28 may be a primary sensor suite 30. In selected embodiments, a primary sensor suite 30 may comprise an array of magnets 32 and sensors 12a. A coupler 18a may extend to connect the head section 26 to the primary sensor suite 30.

Following the primary sensor suite 30 may be a first canister 14a. In one embodiment, the first canister 14a may house the hardware providing the processing and memory storage for the in-line inspection tool 10. A coupler 18b may extend to connect the primary sensor suite 30 to the first canister 14a.

The first canister 14a may be followed by another driving cup 16 and a secondary sensor suite 34. A coupler 18c may engage the second sensor suite 34 and extend rearwardly to engage a second canister 14b. In one embodiment, the second canister 14b may house the batteries providing the power for the in-line inspection tool 10. In selected embodiments, a driving cup 16 may connect to the second canister 14b. One or more position sensors 20 may then engage the second canister 14b, driving cup 16, or some combination thereof to form the tail end 26 of the in-line inspection tool 10. In one embodiment, the position sensors 20 may include one or more odometers 20 positioned to roll along the interior surface of the pipeline and measure the distance traveled by the in-line inspection tool 10.

Figure 2:
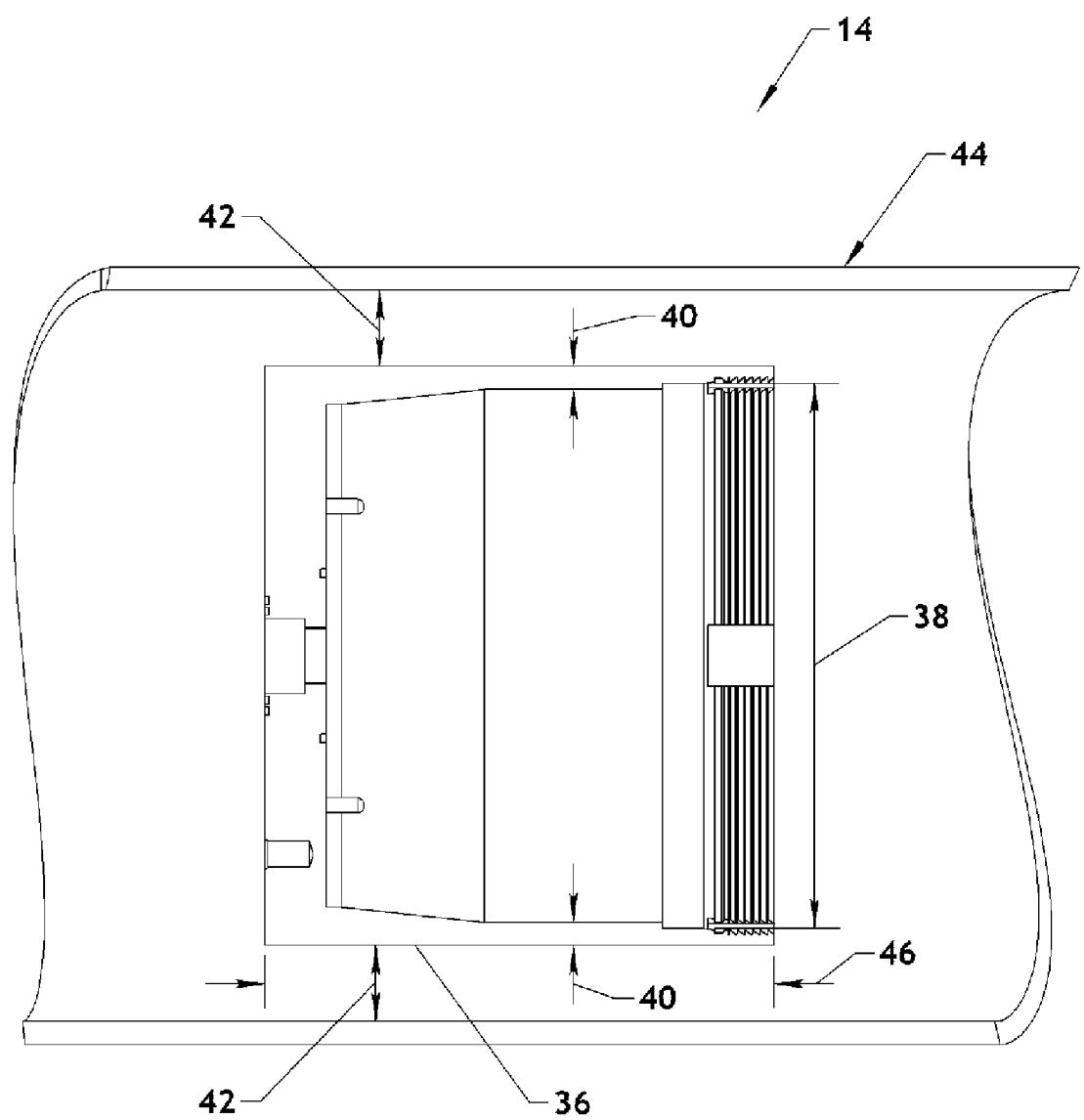
FIG. 2 is a partial, cross-sectional view of one embodiment of a canister body in accordance with the present invention positioned within a pipeline.

Referring to FIG. 2, a canister 14 in accordance with the present invention may be flangeless. In selected embodiments, a canister 14 may comprise a canister body 36. The canister body 36 may define an interior diameter 38 for the canister 14. Without flanges, the interior diameter 38 of the canister body 36 is constrained only by the required wall thickness 40 and the clearance 42 between the exterior of the canister body 36 and the interior of the pipeline 44. The wall thickness 40 provides the necessary pressure-resisting strength and structural support while the clearance 42 enables the tool 10 to navigate bends or other features in the pipeline 44. Thus, a canister body 36 in accordance with the present invention substantially maximizes the interior diameter 38 for a given pipeline 44.

By maximizing the interior diameter 38 of a canister body 36, a canister 14 in accordance with the present invention can house more equipment. Additionally, a canister 14 in accordance with the present invention may be shorter than conventional canisters. That is, a greater diameter 38 permits a canister 14 to house the same amount in a shorter length 46. Shorter lengths 46, in turn, reduce the amount of required clearance 42. As a result, canisters 14 in accordance with the present invention may expand in diameter 38 and maintain the length 46 to provide greater volume, expand in diameter 38 and shorten the length 46 to improve the ability of a tool 10 to navigate bends or other constrictions in a pipeline 44, or some combination thereof.

Figure 3:
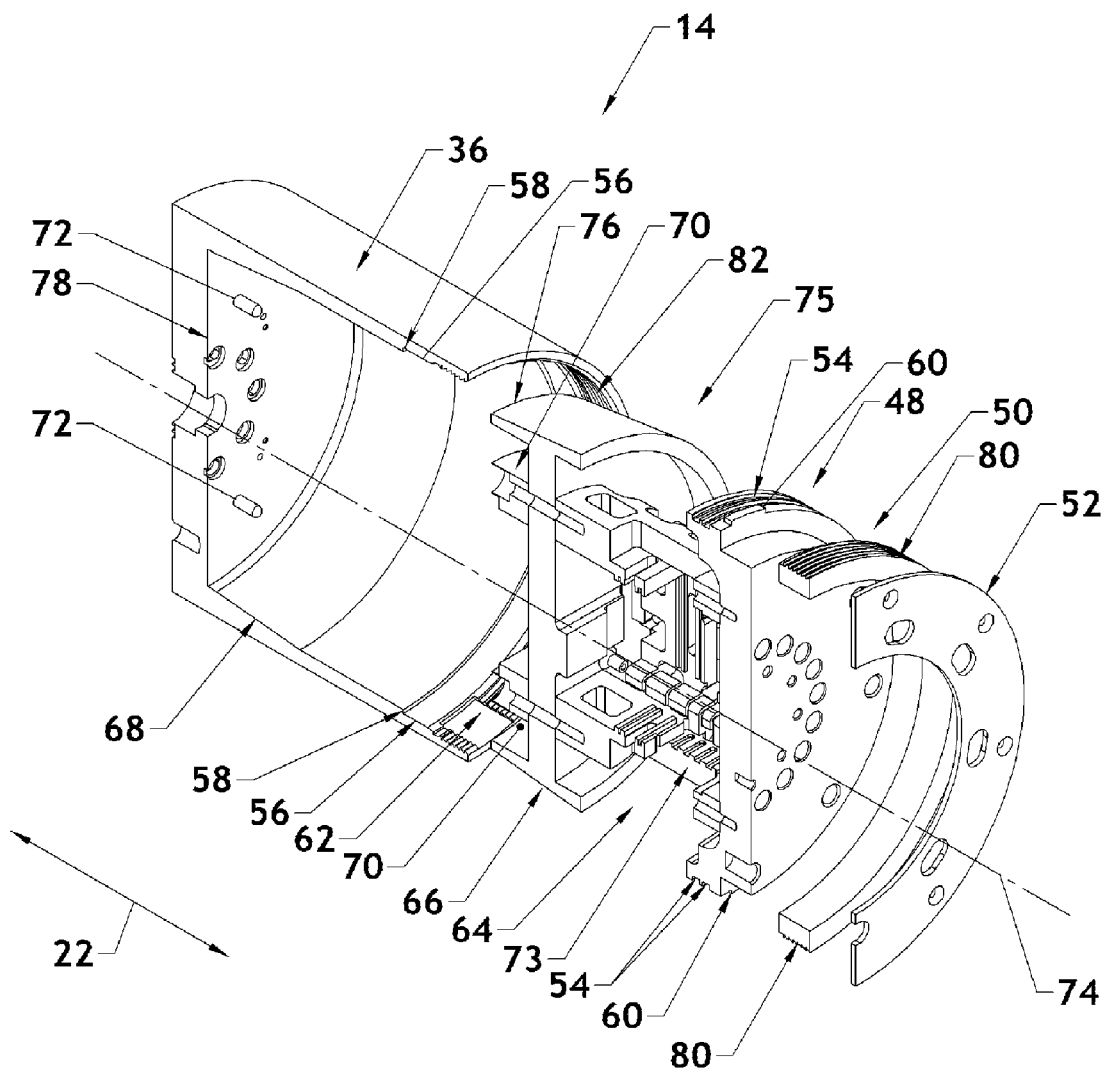
FIG. 3 is an exploded, cross-sectional perspective view of one embodiment of a canister in accordance with the present invention.

Referring to FIG. 3, a canister 14 may comprise a canister body 36, canister lid 48, retaining ring 50, and locking ring 52. A canister body 36 may be configured with one or both ends open. Accordingly, in embodiments having a canister body 36 open at both ends, a canister 14 may comprise multiple canister lids 48, retaining rings 50, and locking rings 52 (i.e., one set for each end of the canister body 36).

In selected embodiments, a canister lid 48 may be inserted within a canister body 36 substantially exclusively through linear translation in the longitudinal direction 22 of the lid 48 with respect to the body 36. A canister lid 48 may comprise one or more O-ring grooves 54 for seating O-rings against the interior bore 56 of the canister body 36. Once fully inserted within a canister body 36, a canister lid 48 may seat against a shoulder 58 formed in the wall of the canister body 36. So seated, the loads caused by external pressure acting on the lid 48 may be transferred to the canister body 36.

In selected embodiments, a canister 14 may comprise an alignment mechanism ensuring proper alignment between a canister body 36 and a canister lid 48. In certain embodiments, an alignment mechanism may comprise one or more alignment tabs 60 extending radially from a canister lid 48. The alignment mechanism may also comprise slots 62 formed within the canister body 36. Accordingly, a canister lid 48 may only be installed within a canister body 36 when the tabs 60 are aligned with corresponding slots 62. In one embodiment, corresponding tabs 60 and slots 62 may be spaced unequally around the interior circumference of a canister 14 so that there is only one relative position at which the canister lid 48 may be inserted within the canister body 36.

In selected embodiments, a frame 64 may be secured (e.g., bolted) to an interior surface of a canister lid 48. Accordingly, the frame 64 may be inserted within the canister body 36, and withdrawn therefrom, together with the canister lid 48. The frame 64 may support the components to be housed within the canister 14.

A frame 64 may have any suitable shape or configuration. In certain embodiments, a frame 64 may engage or align with the canister body 36. For example, a frame 64 may comprise a taper 66 (e.g., tapered component 66) configured to abut a corresponding surface 68 formed as part of the container body 36. In one embodiment, the taper 66 and corresponding surface 68 may extend circumferentially about a central axis 74 extending in the longitudinal direction 22.

A frame 64 may also comprise one or more apertures 70 configured to engage corresponding extensions 72 extending from the container body 36. In selected embodiments, during assembly the taper 66 and corresponding surface 68 may act to guide the apertures 70 and extensions 72 (and any other connecting components) into engagement with one another. Accordingly, a proper alignment between the frame 64 and the canister body 36 may be assured.

In selected embodiments, a taper 66 may provide a mechanism for conducting heat from the components housed within a canister 14 to the exterior of the canister 14. For example, a frame 64 may comprise individual mounting apparatus 73 to which components (e.g., processors, circuit boards, memory devices, batteries, and the like) may be secured such that the heat generated thereby may be conducted to the frame 64. The frame 64 may be formed of a material supporting effective conduction of heat (e.g., aluminum, copper, etc.). Typically, the frame 64 may comprise a heat conducting component 75 that is attached to the frame 64 so that it contacts a processor or other source of heat mounted on the frame 64. This component 75 may comprise a taper 66 to provide a location where the heat carried by the frame 64 may be conducted to the canister body 36. Once in the canister body 36, the heat may be transferred to the fluid surrounding the canister 14 (e.g., the fluid traveling within the pipeline 44).

In that the contact area between a taper 66 and the corresponding surface 68 may be significant, the rate at which heat may be passed therebetween may be relatively high. The rate of heat transfer between the taper 66 and corresponding surface 68 may be further increased by adding a thermally conductive lubricant at the interface therebetween. Such a lubricant may also facilitate removal of the frame 64 from the canister body 36.

The alignment provided by a taper 66 and corresponding surface 68, extensions 72 and corresponding apertures 70, or some combination thereof may ensure that the multiple complex electrical connections are simultaneously made as a frame 64 and canister lid 48 combination is advanced into a canister body 36. Moreover, in such embodiments, when a canister lid 48 and frame 64 are separated from a canister body 36 and the data lines are disconnected from the canister lid 48, the combined frame 64 and canister lid 48 assembly may sit upright on a workbench, with the canister lid 48 acting as a stabilizing and supporting pedestal. Accordingly, the electrical components mounted to the frame 64 may be readily accessed and there is no need to work on such components within the confines of the canister body 36.

In selected embodiments, the taper 66 and corresponding surface 68 may be omitted. In such embodiments, the alignment between a frame 64 and a canister body 36 may be provided by the engagement of the apertures 70 and extension 72. If desired or necessary, heat transfer between the frame 64 and the canister body 36 in such embodiments may be effected through contact between the end surface 76 of a heat conducting component of the frame 64 and the end surface 78 of the canister body 36. In such embodiments, heat transfer may be improved by adding a thermally conductive paste, tape, or similar material to fill any voids and improve the thermal contact between surfaces.

An extension 72 in accordance with the present invention may connect to a canister body 36 in any suitable manner. In one embodiment, an extension 72 may engage the canister body 36 with a threaded engagement. An extension 72 may have any suitable length. In selected embodiments, one or more extensions 72 may be lengthened sufficiently to support the frame 64, independent of the canister lid 48. That is, the extensions 72 may be sufficiently long that the frame 64 may be positioned within the canister body 36 first, before the canister lid 48 is installed. Such an embodiment may be helpful for canisters 14 housing components like batteries that may require a uniform interior diameter 38 along the entire length of the interior of the canister body 36.

Once the tabs 60 and slots 62 are aligned and a canister lid 48 is inserted sufficiently within a canister body 36, a retaining ring 50 may be installed to seat the canister lid 48 firmly against the shoulder 58 in the canister body 36. In selected embodiments, a retaining ring 50 may comprise threads 80 sized and positioned to engage corresponding threads 82 formed on the interior of the canister body 36. As a retaining ring 50 is threaded into place, the canister lid 48 may be held in place by the tabs 60 and slots 62. Accordingly, no wired connections between the canister lid 48, frame 64, and canister body 36 may be twisted or misaligned.

A retaining ring 50 may be advanced into the canister body 36 until the canister lid 48 is seated against the shoulder 58 in the canister body 36 with a desired load. In selected embodiments, the frame 64 may be sized such that firmly seating the canister lid 48 against the shoulder 58 does not overly urge a taper 66 against the corresponding surface 68.

Once a canister lid 48 is seated on the shoulder 58 of the canister body 36 and held there by a retaining ring 50, the position of the canister lid 48 with respect to the canister body 36 is substantially fixed. That is, the shoulder 58 and retaining ring 50 limit the motion of the lid 48 in the longitudinal direction, the interior bore 56 of the canister body 36 limits the motion of the lid 48 in the radial direction, and the tabs 60 and slots 62 limit the rotation of the lid 48 about the central axis 74 extending in the longitudinal direction 22.

Figure 4:
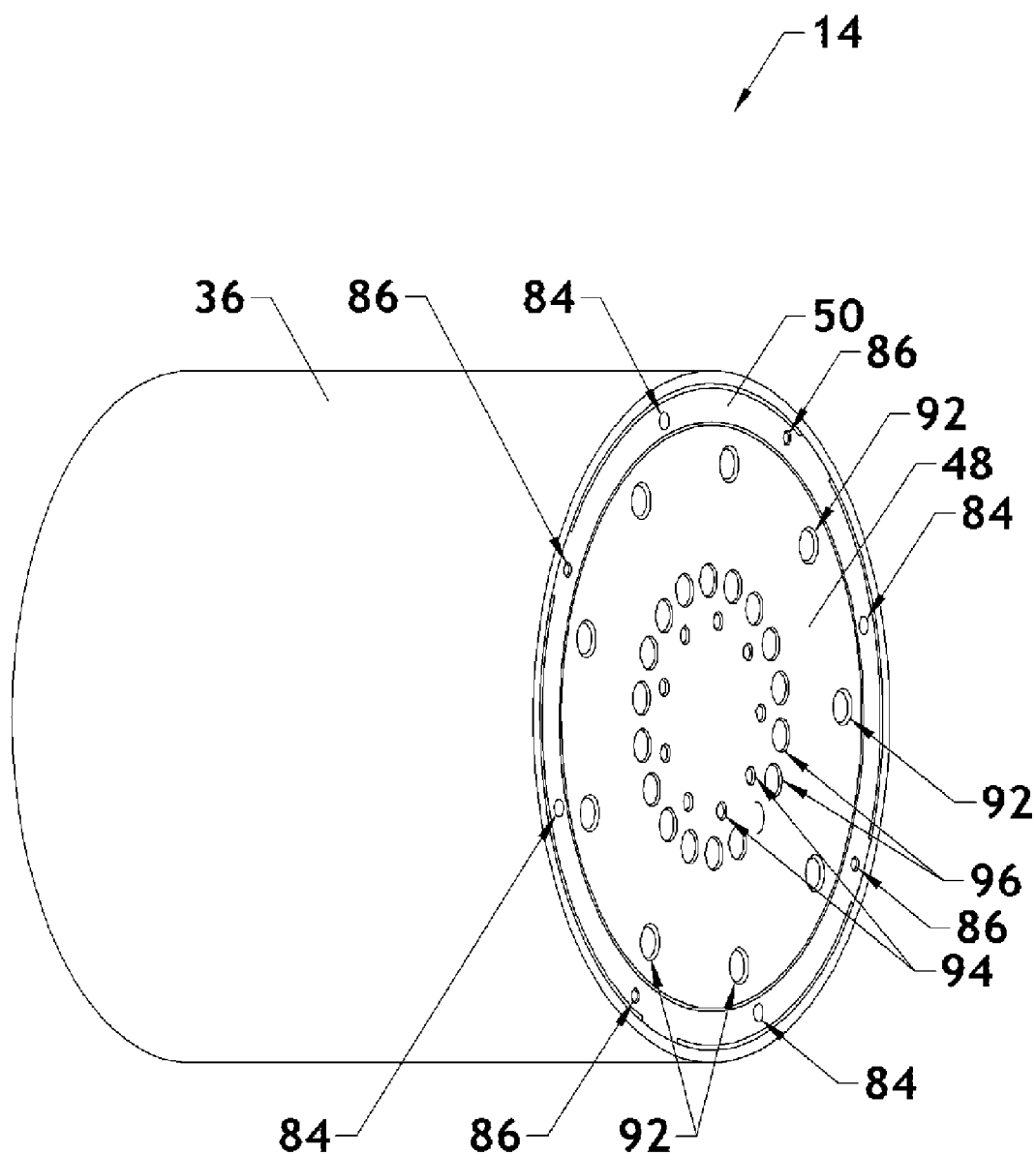
FIG. 4 is a perspective view of one embodiment of a canister in accordance with the present invention with a canister lid and retaining ring installed.
Figure 5:
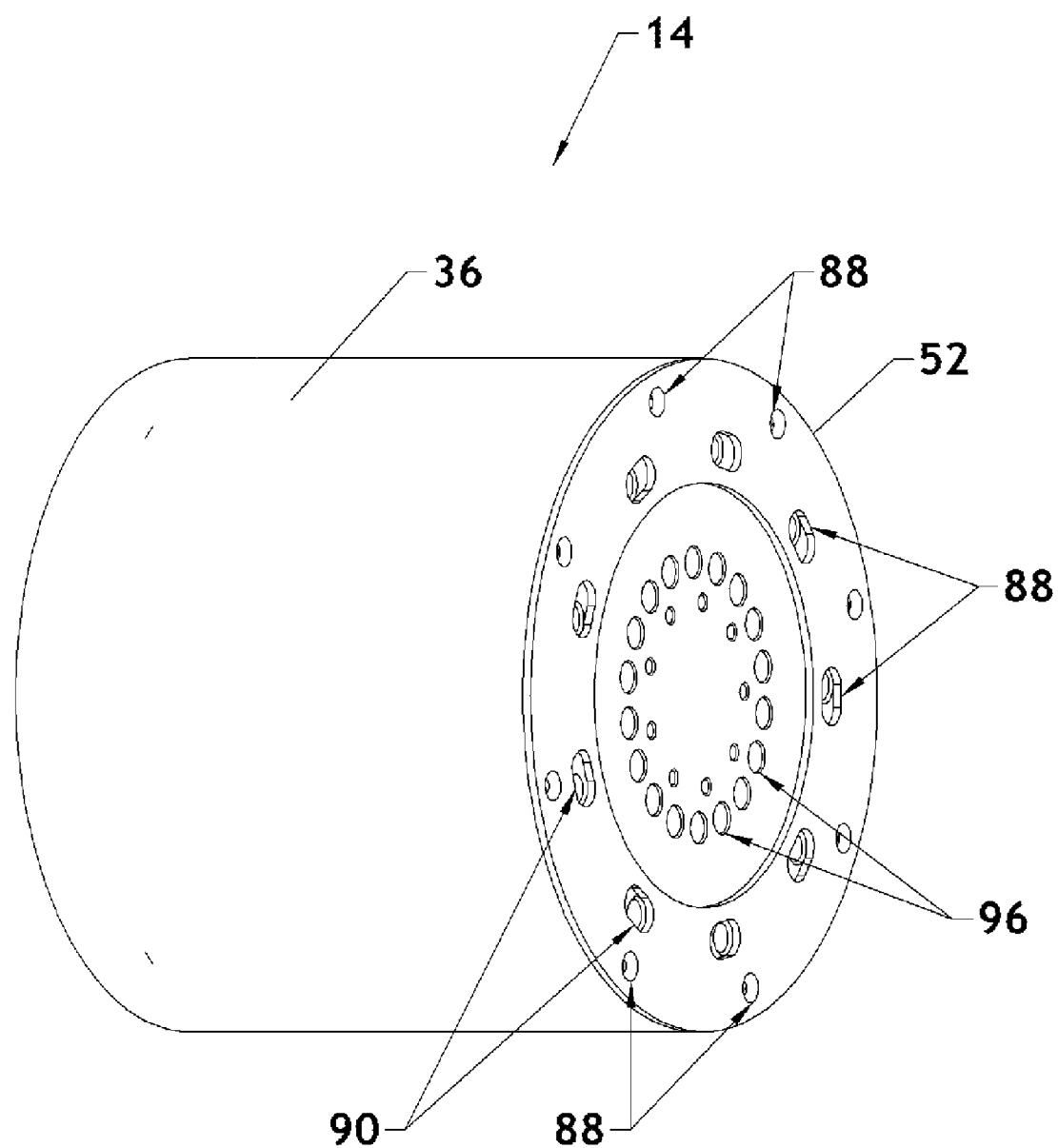
FIG. 5 is a perspective view of the canister of FIG. 4 with a locking ring installed in accordance with the present invention.

Referring to FIGS. 4 and 5, in selected embodiments, a retaining ring 52 may comprise various apertures. Certain apertures 84 may provide locations for a spanner wrench to engage a retaining ring 50. Accordingly, the interfaces between a canister lid 48 and the shoulder 58 of a canister body 36 and between the canister lid 48 and a retaining ring 50 may be pre-stressed as the retaining ring 50 is tightened. Other apertures 86 may be threaded and provide locations for bolts to engage a locking ring 52.

In certain embodiments, a locking ring 52 may connect a canister lid 48 to a retaining ring 50 and, thereby, prevent rotation of the retaining ring 50 with respect to the canister lid 48 or canister body 36. In certain embodiments, a locking ring 52 may be secured to a retaining ring 50 by bolts passing through a first set of apertures 88 in the locking ring 52 and engaging threaded apertures 86 in the retaining ring 50. A locking ring 52 may be secured to a canister lid 48 by bolts passing through a second set of apertures 90 in the locking ring 52 and engaging corresponding threaded apertures 92 in the canister lid 48. In selected embodiments, the second set of apertures 90 may be elongated, allowing bolts to access the underlying threaded apertures 92 with less regard to the position of the retaining ring 50 when it is fully seated.

In selected embodiments, bolts passing through the second set of apertures 90 to engage the corresponding threaded apertures 92 in the canister lid 48 may provide a mechanism for connecting neighboring components to a canister 14. For example, such bolts may connect a canister 14 to a coupler 18, driving cup 16, or the like. Tightening such bolts may effect a secure connection between a locking ring 52 and a canister lid 48.

A canister lid 48 may comprise various apertures 94, 96 formed therein. Certain apertures may be structural. For example, certain apertures 96 may provide access for electronic connectors suitable to engage corresponding connectors in an adjacent component passing data into the interior of the canister 14. Other apertures 94 may provide locations for bolts holding such connectors in place. Still other apertures may facilitate other communication between the various components of an in-line inspection tool 10.

Assembly of an in-line inspection tool 10 in accordance with the present invention may affect hundreds of electrical connections. For example, connectors mounted in certain apertures 96 within a canister lid 48 may, when properly connected to connectors of adjacent components, relay signal from sensors 12 located on the exterior of an in-line inspection tool 10 to hardware housed within a canister 14. By ensuring a proper alignment between components such as a canister body 36, canister lid 48, and frame 64, proper electrical connections may be made between adjacent electrical connectors.

Figure 6:
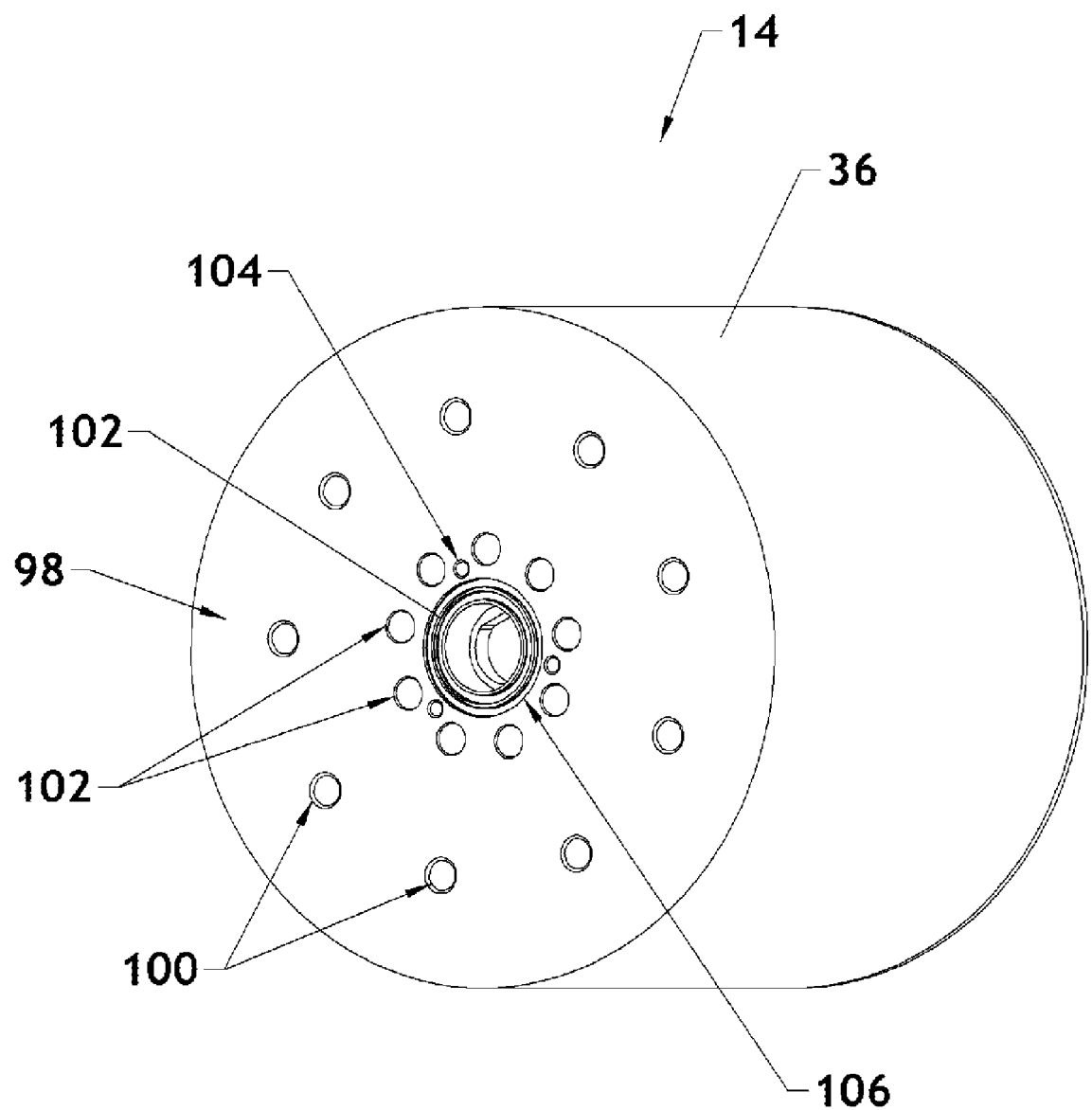
FIG. 6 is a perspective view of the other end of the canister of FIG. 4.

Referring to FIG. 6, like a canister lid 48, the blind end 98 of a canister body 36 may comprise various apertures. A blind end 98 may comprise apertures 100 (e.g., threaded apertures) for receiving bolts connecting neighboring components to a canister 14. For example, such bolts may connect a canister 14 to a coupler 18, driving cup 16, or the like. Other apertures 102 may provide locations for mounting electronic power or other connectors. Still other apertures 104 may be added as desired or necessary to hold connectors in place. Moreover, in selected embodiments, one or more grooves 106 for housing O-rings may be formed in the blind end 98 of a canister body 36. Accordingly, certain apertures may be sealed to prevent unwanted materials from entering a canister 14.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An in-line inspection tool for inspecting a pipeline while traveling therethrough, the in-line inspection tool comprising:
   a sensor suite comprising a plurality of sensors, each sensor of the plurality of sensors generating a signal;
   a processor processing the signal generated by at least one sensor of the plurality of sensors to produce a processed signal;
   a memory device storing the signal generated by at least one sensor and the processed signal; and
   a canister housing the processor and memory device and comprising
      a canister body formed as a hollow cylinder extending along a central axis from a first end to a second end opposite the first end,
      a canister lid inserted within the first end of the canister body,
      an alignment mechanism preventing rotation of the canister lid with respect to the canister body about the central axis, and
      a retaining ring engaging via threads the first end of the canister body to maintain the canister lid within the first end of the canister body.

2. The in-line inspection tool of claim 1, wherein the canister body comprises a shoulder formed in the interior thereof proximate the first end.

3. The in-line inspection tool of claim 2, wherein the canister lid is held against the shoulder by the retaining ring.

4. The in-line inspection tool of claim 3, further comprising a locking ring bolted to both the retaining ring and the canister lid.

5. The in-line inspection tool of claim 1, further comprising a frame contained within the canister body, the frame having a first end and a second end opposite the first end, the first end of the frame bolted to the canister lid.

6. The in-line inspection tool of claim 5, wherein the processor and memory device are supported by the frame.

7. The in-line inspection tool of claim 6, further comprises a thermally conductive member supported by the frame, the thermally conductive member contacting the processor.

8. The in-line inspection tool of claim 7, wherein the thermally conductive member comprises a taper formed proximate the second end.

9. The in-line inspection tool of claim 8, wherein the canister body further comprises a corresponding surface shaped to contact the taper.

10. The in-line inspection tool of claim 9, wherein the thermally conductive member thermally connects the processor to the canister body.

11. The in-line inspection tool of claim 10, further comprising one or more extensions extending within the canister body, the frame further comprising one or more apertures, each aperture of the one or more apertures configured to engage a corresponding extension of the one or more extensions.

12. The in-line inspection tool of claim 5, wherein the canister further comprises a second lid, a second retaining ring, and a second locking ring and the processor and memory device are supported by the frame.

13. The in-line inspection tool of claim 5, further comprising one or more extensions extending within the canister body, the frame further comprising one or more apertures, each aperture of the one or more apertures configured to engage a corresponding extension of the one or more extensions.

* * * * *